March 25, 1930.                F. H. OHLAND                    1,751,710
                          MAGNETIC TESTING DEVICE
                            Filed June 17, 1926
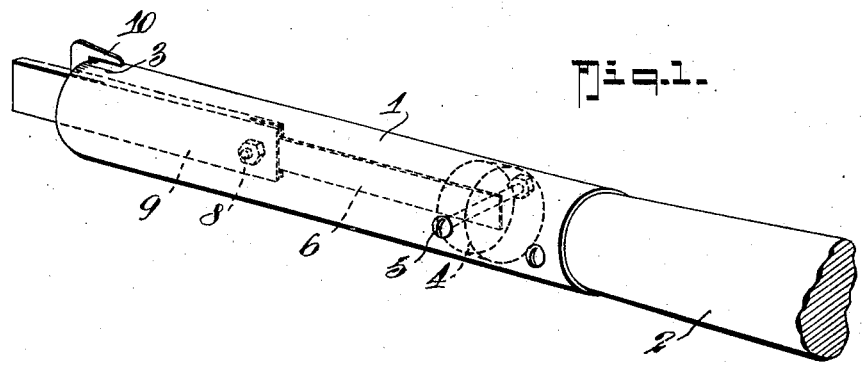
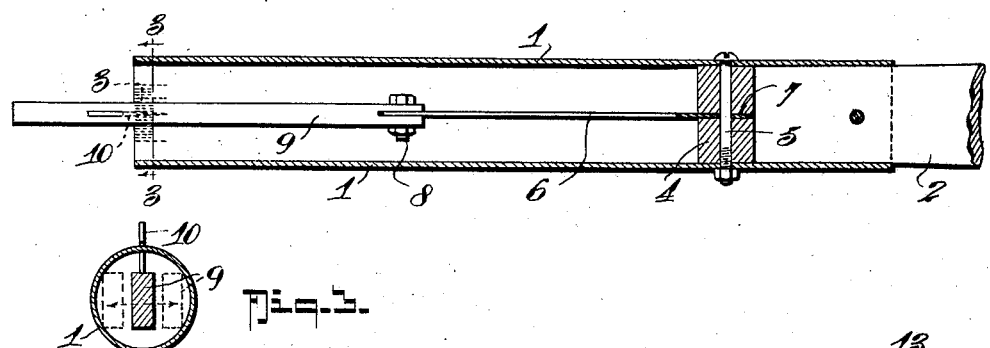
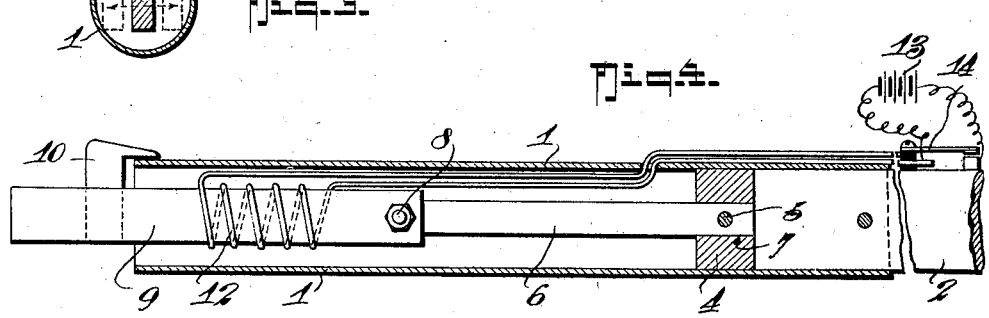
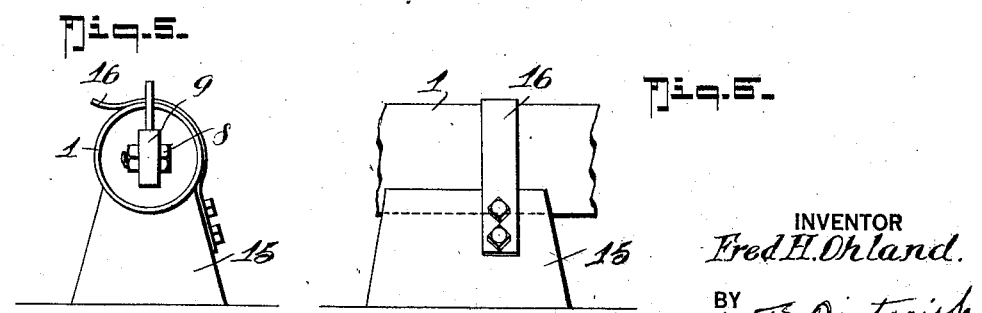
INVENTOR
Fred H. Ohland.
BY
ATTORNEY Patented Mar. 25, 1930

1,751,710

UNITED STATES PATENT OFFICE

FRED H. OHLAND, OF GIBBON, MINNESOTA

MAGNETIC TESTING DEVICE

Application filed June 17, 1926. Serial No. 116,667.

The invention generally has reference to steel testing devices and primarily has for its object to provide a mechanical means for ascertaining the critical point in the process of tempering steel.

In the hardening of steel the mass is heated to gradually increasing temperature up to a certain desired degree and then suddenly cooled. It is difficult to ascertain the critical point in this process, that is, the point at which the mass should be suddenly cooled and it is the purpose of my present invention to provide a mechanical means for indicating this point in the process and supplant the present common method of relying on the color assumed by the steel when reaching the said critical point.

In its more detail nature, the invention seeks to provide a simple and efficient instrument by the use of which the critical point in the process of hardening steel may be efficiently indicated, the said instrument comprising a non-magnetic support and a vibratory magnet carried thereby which will be caused to vibrate when the instrument is held within the influence of the steel being heated and which will cease to vibrate as the critical point in the process is reached and thus indicate the reaching of said critical point.

With the above and other objects in view that will hereinafter appear the invention further resides in the novel details of construction, combination and arrangement of parts, all of which will be first fully described, then be particularly pointed out in the appended claims, reference being had to the accompanying drawing, in which:

Figure 1 is a perspective view of the invention.

Figure 2 is a central horizontal section of the instrument looking upward.

Figure 3 is a cross section taken through the front or indicator end of the instrument.

Figure 4 is a central longitudinal section illustrating a modified form of the invention.

Figures 5 and 6 are a side elevation and end view respectively of a spring support by which the instrument may be supported in use if desired.

In the drawing, in which like numerals of reference indicate like parts in all of the figures, 1 indicates a tube of non-magnetic material, such as brass, from the rear end of which projects a heat non-conducting handle 2.

The tube 1 is provided with graduations 3 at the upper edge of its front end for a purpose later to be described.

Intermediately of its ends the tube 1 is provided with a cross brace 4 secured in the tube as at 5.

A leaf spring 6 is secured as at 7 to the brace 4 and projects forwardly therefrom centrally of the tube 1 and in a vertical plane. The spring 6 is secured as at 8 to the rear end of a fixed magnet 9, said magnet's rear end being projected into the front end of the tube and the advance end of said magnet projecting a distance beyond the said tube end.

The magnet 8 is provided at its upper edge adjacent the front end of the tube with a pointer or indicator finger 10, the said finger extending over the upper advance edge of the tube to cooperate with the graduations 3 with which the said tube edge is provided.

When the parts above described are in the normal position the magnet 8, resiliently mounted upon the spring 6, is at rest with the indicator 10 thereof directly above the central graduation at the top edge of the tube.

In use, the advance end of the tube 1 is projected into position for having the magnet carried thereby influenced by the magnetic conductivity of the steel being heated, the said magnet thus being deflected laterally by reason of the magnetic attraction of the same toward the steel body and the resilient mounting thereof in the said tube.

It is well known that as the steel reaches the critical point in the heating process it loses all, or substantially all, of its magnetic conductivity, thus, the deflection of the magnet 9 will continue so long as it is being influenced by the magnetic conductivity of the steel body with which it is being held in proximity, but upon the reaching of the critical point, the steel body loses its magnetic conductivity, the magnet 9 will cease to be influenced thereby and its indicator will come to rest above the central graduation upon the tube end, thus indicating that the critical point in the heating process has been reached.

In Figure 4 of the drawing, I have illustrated a slight modification in which instead of using a fixed magnet an electromagnet is employed.

In the said Figure 4, 11 indicates the electromagnet core body around which is wound the coil 12 of insulated wire, the end of the said wire being carried out of the tube 1 and connected with a suitable source of electrical energy, diagrammatically indicated at 13, through the make and break switch 14 which may be mounted upon the supporting handle. Thus, the resiliently suspended magnet need be energized by closing the switch 14 only when it is desired to use the instrument.

In Figures 5 and 6, I have illustrated a spring clip rest device upon which the instrument may be mounted if it is desired to hold the same during the testing operation mechanically. In these figures, 15 indicates a rest block of suitable weight and having the upper face thereof hollowed out to receive the tube carrying handle, the said block being equipped with a spring clip 16 adapted to partially encircle the said handle to secure the same upon the block.

In the foregoing description I have disclosed a simple and efficient instrument whereby the critical point in tempering steel may be efficiently and mechanically indicated, the said instrument being simple in construction, economical to manufacture and efficiently operable for its intended purposes.

What I claim is:

1. A device of the class described comprising a tubular supporting member of non-magnetic material, a cross wall secured in one end of the tubular member, a spring having one end secured in the cross wall and having its free end projected axially part way toward the other end of the tubular member, and a magnet secured to the free end of the spring to be suspended freely in and project from the said other tube end, said cross wall being spaced inwardly of the tubular member end in which it is mounted to form an end socket, a handle of heat non-conductive material secured in and projecting from the end socket, graduations on the other tubular member end, and an indicator pointer carried by the magnet and associated with the graduations for the purposes specified.

2. A device of the class described comprising a tubular supporting member of non-magnetic material, a bar magnet projecting into and from one end of the tubular member, means including a flexible leaf spring for mounting the magnet in the tubular member end to permit vibratory movement thereof, said tubular member having at one end visible graduation lines thereon, an indicator finger carried by the projecting end of said magnet and including a backwardly extended portion to overlie said graduated end of said tubular member and cooperate with the graduations thereon to indicate deflection of said magnet when the same is positioned to be influenced by a magnetic substance.

FRED H. OHLAND.